Jan. 15, 1963 R. R. GRIFFEN 3,073,378
FUEL SUPPLY SYSTEM INCLUDING LEVEL MAINTAINING
FLOAT VALVE MEANS
Filed Feb. 19, 1960 3 Sheets-Sheet 1

INVENTOR.
RALPH R. GRIFFEN
BY
Walter Patonoha, Jr.
ATTORNEY

INVENTOR.
RALPH R. GRIFFEN
BY
Walter Patoraka, Jr.
ATTORNEY

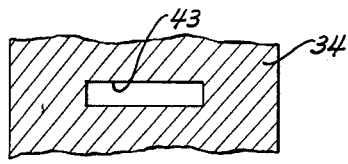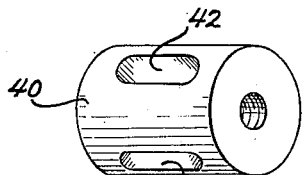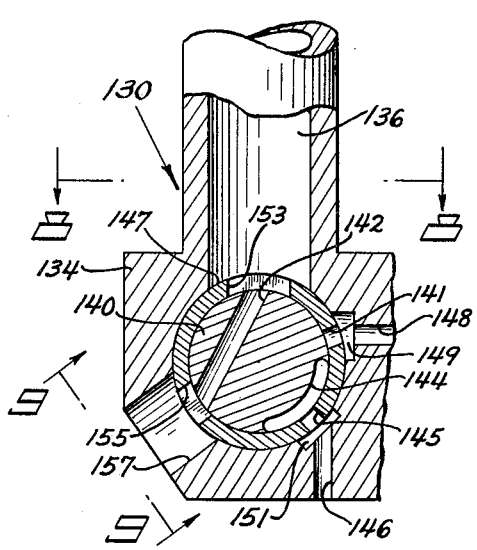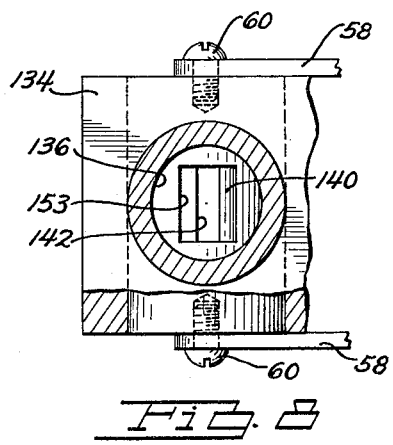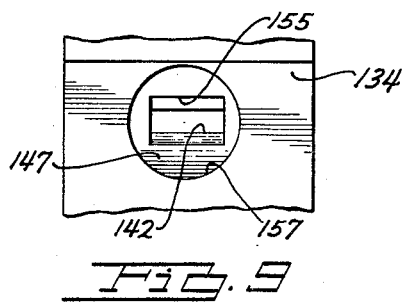

United States Patent Office 3,073,378
Patented Jan. 15, 1963

3,073,378
FUEL SUPPLY SYSTEM INCLUDING LEVEL MAINTAINING FLOAT VALVE MEANS
Ralph R. Griffen, Roseville, Mich., assignor to Holley Carburetor Company, Van Dyke, Mich., a corporation of Michigan
Filed Feb. 19, 1960, Ser. No. 9,789
2 Claims. (Cl. 158—38)

This invention relates generally to carburetors, and more specifically to means for supplying fuel to the fuel reservoir normally associated with carburetors and for maintaining the fuel level therein constant.

The present practice is to control the fuel supply to the fuel reservoir of a carburetor by means of a needle valve positioned by a float. While the control systems presently employed have been acceptable, they do have some disadvantages. For instance, they are incapable of reducing excessive fuel levels within the fuel reservoir caused by leakage of fuel past an improperly seated valve or the untimely opening of the valve due to angularity, road vibrations, and other abnormal disturbances of the float, except by consumption of said fuel in operation of the engine.

Additionally, with present needle valve designs and the trend to larger engines, a fuel pump pressure of from four to six pounds is required for efficient engine operation. If lower pressures were used, an insufficient amount of fuel would be supplied to the fuel reservoir and the proper level would not be maintained at higher engine fuel demands, for example. Providing a greater inlet are to permit more fuel to be supplied when the valve is open is undesirable because it increases the total valve-opening force, thereby still further increasing the undesirable leakage past the valve when the valve is improperly seated or opened due to float vibration. Dimensional limitations prevent the control of this greater force by larger floats and longer float arms.

Also the higher fuel pump pressures required to supply sufficient fuel through the smaller valve result in excessive velocities of the incoming fuel, and these higher velocities cause turbulence of the fuel in the fuel reservoir. This turbulence not only disturbs the metering head, but it often causes frothing of the fuel to the extent at times that the froth is discharged into the induction passage through the internal vent.

It is now proposed to eliminate some of the above objections by providing a rotary-type inlet valve system for a carburetor fuel reservoir. Since the fuel inlet pressure of the proposed system is not directly opposed by the float-controlled needle valve as in the systems presently used, pressures in the order of one or two pounds of fuel pressure may be employed. The lower fuel inlet pressures permit a smaller float and float arm and a larger fuel inlet area so as to supply sufficient fuel, even at increased engine fuel demands. Also, since lower pressures and larger inlet areas are employed, the velocity of the incoming fuel is lower, even when large volumes of fuel are being consumed, and the fuel level is less likely to be disturbed so that proper fuel metering head is more likely to be maintained and frothing does not occur as readily.

The proposed system also embodies fuel overflow means, which not only removes excessive fuel levels due to float disturbances but permits larger clearances between rotary valve and the valve body, since leakage through these clearances is readily accommodated by the overflow system. The larger clearances reduce manufacturing costs and reduce the chances of the valve sticking due to fine dirt particles that may be contained in the fuel.

Accordingly, it is now proposed to provide automatic means for allowing quantities of fuel to be directed to a fuel bowl so as to maintain a predetermined desired level and yet allow the escape of excessive quantities of fuel from the fuel bowl when such conditions exist.

A further object of this invention is to provide means for discharging the fuel into the fuel bowl in a manner so as to either eliminate or materially reduce the condition of fuel frothing.

Other objects and advantages will become more apparent when reference is made to the following written description and drawings wherein:

FIGURE 5 is a fragmentary cross-sectional view taken on line 5—5 of FIGURE 3 and looking in the direction of the arrows.

FIGURE 6 is a view illustrating one of the elements of the invention in perspective.

FIGURE 7 is a fragmentary view in cross-section, similar to that of FIGURE 2 and illustrating a modification of the invention.

FIGURE 8 is a view partly in cross-section taken on line 8—8 of FIGURE 7 and looking in the direction of the arrows.

FIGURE 9 is a fragmentary view taken on line 9—9 of FIGURE 7 and looking in the direction of the arrows.

Figure 1:
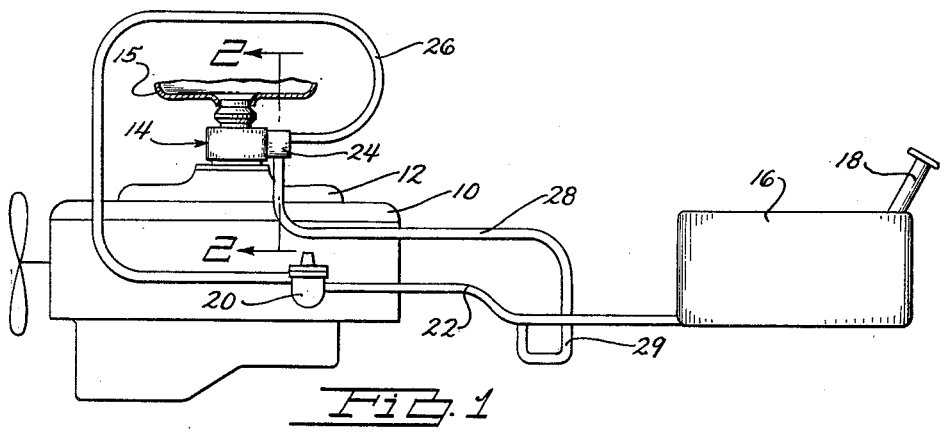
FIGURE 1 is a schematic illustration of an internal combustion engine equipped with a carburetor having a fuel bowl therein constructed in accordance with the teachings of this invention.

Referring now in greater detail to the drawings, FIGURE 1 illustrates schematically an internal combustion engine 10 with an induction manifold 12 to which the carburetor structure 14 and air cleaner 15 are suitably secured. A fuel tank 16, having a conventional filler pipe 18, communicates with a fuel pump 20 by means of conduit 22. The fuel pump 20, in turn delivers fuel to the carburetor fuel bowl 24 by means of conduit 26. A return conduit 28 adapted to remove excessive quantities of fuel from within the interior of the fuel bowl 24 communicates with conduit 22, on the fuel tank side of pump 20. A trap portion 29 may be provided in conduit 28, the purpose of which will be discussed later.

Figure 2:
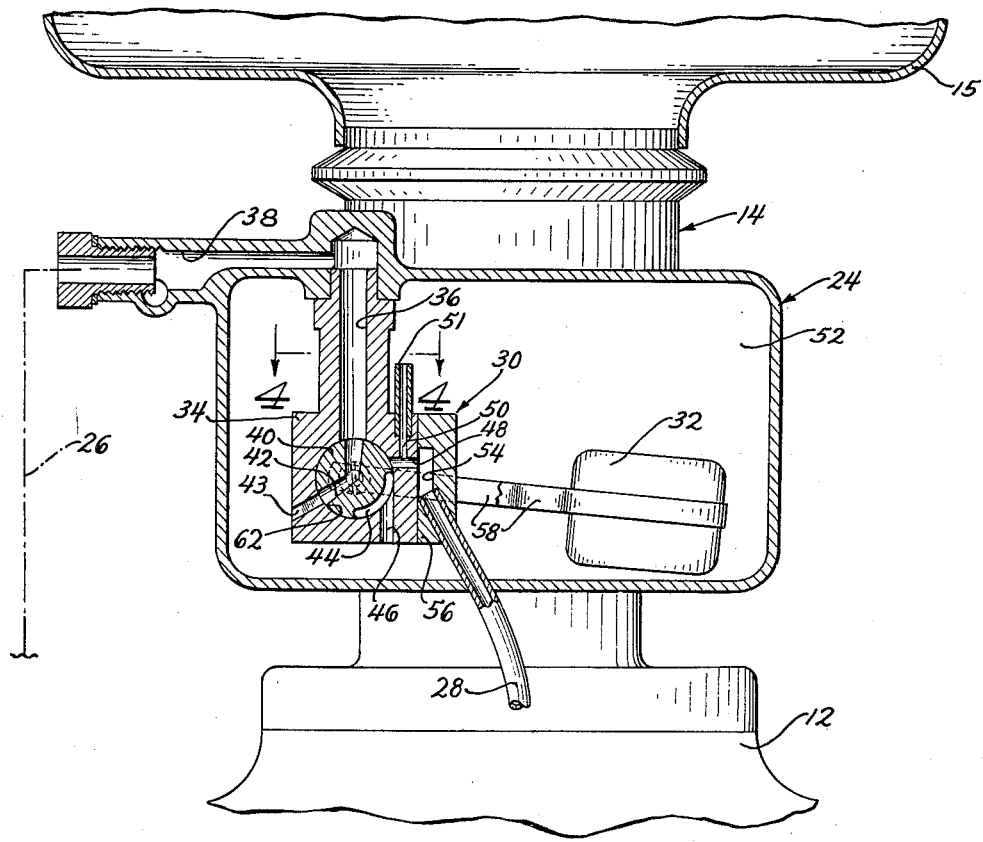
FIGURE 2 is a cross-sectional view illustrating a fuel bowl constructed in accordance with the invention, taken on the plane of line 2—2 of FIGURE 1 and looking in the direction of the arrows.

FIGURE 2 illustrates in greater detail the fuel inlet valve assembly 30 as being comprised generally of a body portion 34 having a conduit 36 formed therein and adapted to communicate between the fuel inlet 38 and the control valve 40. The valve 40, being of generally cylindrical form, contains a conduit portion 42 which is formed in a generally radial manner therein. Additionally, a relieved arcuate portion 44 is formed on the outer diameter of the valve 40 in a manner so as to at times communicate between conduits 46 and 48. Conduit 50, which may be formed by the provision of tubular member 51, communicates between the general cavity 52 of the fuel bowl and conduit 48. A chamber 54, formed generally by the body 34 and member 56, communicates between conduit 48 and return conduit 28. Conduit 43, formed within body 34, is adapted to deliver fuel into the cavity 52 at a rate controlled by conduit 42 of valve member 40. The float 32, having suitable lever arms 58, is rigidly secured thereby to valve 40, as by means of screws 60.

In the operation of the device, fuel is supplied in the conventional manner by means of pump 20 to the inlet 38 of the fuel bowl structure 24. Subsequently, the fuel flows through conduit 36, through the valve 40 by means of conduit 42 and ultimately through conduit 43 and into the chamber 52 of the fuel bowl. As the fuel is so supplied, the float 32 is caused to rise and in turn rotate valve 40. As the valve 40 continues to rotate, orifice 62 of conduit 42 eventually moves out of alignment with conduit 43, thereby terminating the fuel flow through conduit 36 into the fuel bowl.

If for some reason the carburetor is inclined, for example, to the left so as to cause orifice 62 to again be in juxtaposition with conduit 43, excessive quantities of fuel could be delivered to the fuel bowl. Subsequently, upon return to a normal level position, the fuel bowl could have such excessive quantities of fuel therein as to possibly cause overflow into the carburetor or onto the engine.

Figure 3:
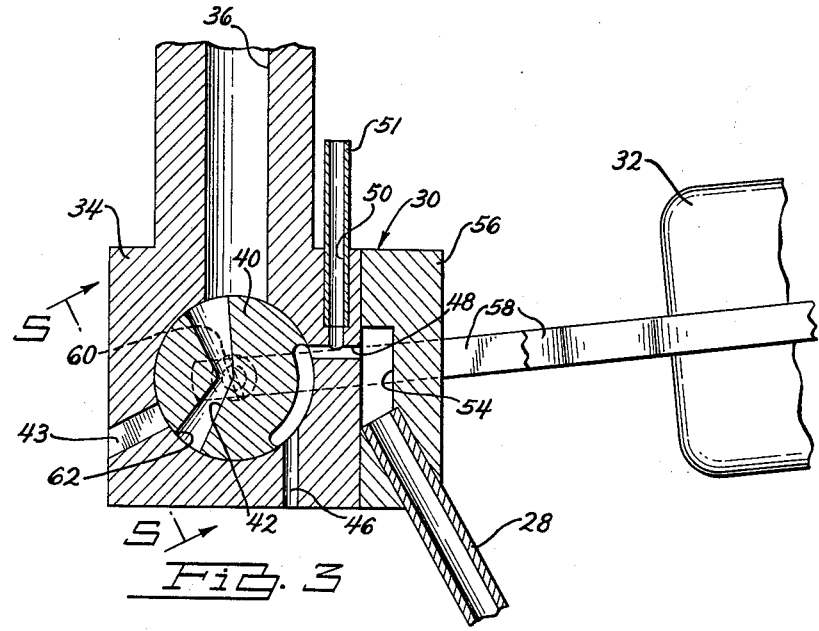
FIGURE 3 is an enlarged fragmentary illustration of the fuel inlet valve and float as illustrated generally by FIGURE 2, with the float and valve being shown in their upper position.

In order to prevent the above possibility from occurring, the relieved portion 44 is provided and adapted to complete communication between conduits 46 and 48. Assuming that an excessive quantity of fuel exists within the fuel bowl and referring to FIGURE 3, it will be apparent that the float 32 will be in a somewhat extreme raised position, which causes the relieved portion 44 to be in the position illustrated. As a result of this, the fuel head existing within the fuel bowl causes some fuel to flow through conduit 46, relieved portion 44, conduit 48, through chamber 54 and return conduit 28. The fuel continues to flow through the system in this manner and back to the inlet side of pump 20 until the level of the fuel within the bowl is materially reduced, causing the float 32 to lower itself and rotate valve 40 clockwise to a position where portion 44 no longer is completing the communication between conduits 48 and 46.

Conduit 50 is provided strictly as a bleed orifice which prevents any undesirable siphoning of fuel from the fuel bowl by means of conduit 28. The trap portion 29 of conduit 28 is provided in order to retain a sufficient amount of fuel therein so as to prevent any air possibly drawn through conduit 50 from entering conduit 22. Obviously, a suitable check valve could be employed instead of the trap 29.

FIGURE 6 illustrates generally the shape of valve 40 and conduit 42 which is preferably made elongated. By having conduit 42 so shaped, it is possible to present a rather large orifice area to conduit 36 upon rather small movements of float 32. This makes it possible to use a fuel pump of lower pressure and still deliver the required rate of fuel flow at a lower velocity. This is not possible with the conventional needle inlet valves because an increase in discharge orifice area results in a higher force on the needle tending to open it.

FIGURES 7, 8 and 9 illustrate a modification of the invention. In FIGURE 7 the inlet valve assembly 130 is illustrated as comprising a body portion 134 having a conduit 136 formed therein and adapted to communicate between the fuel inlet 38 and the control valve 140. The valve 140, as valve 40, is of generally cylindrical form and contains therein a conduit 142. A relieved arcuate portion 144 is also provided on the outer diameter of the valve 140 so as to at times complete the communication between ports 141 and 145 of the sleeve member 147. Conduits 148 and 146, similar to conduits 48 and 46, communicate with ports 141 and 145, respectively, as by means of counterbored recesses 149 and 151.

The sleeve 147 also has inlet and discharge ports 153 and 155 which coact with the opposite ends of conduit 142. Once the sleeve 147 is assembled to body 134 it is to remain stationary during operation, while the valve member 140 rotates in accordance with the position of float 32. The float 32 can, of course, be connected to the valve 140 by means of lever arm 58 and screws 60 as was valve 40.

The operation of the invention as illustrated in FIGURE 7 is the same as previously described. That is, the fuel coming from conduit 136 passes through port 153, conduit 142 and exits therefrom, through port 155 and conduit 157, into the fuel bowl chamber 52.

FIGURES 8 and 9, which are views taken on the plane of lines 8—8 and 9—9, respectively, of FIGURE 7 illustrate the cooperative action between the ports 153 and 155 of sleeve 147 and conduit 142 of valve 140.

Figure 4:
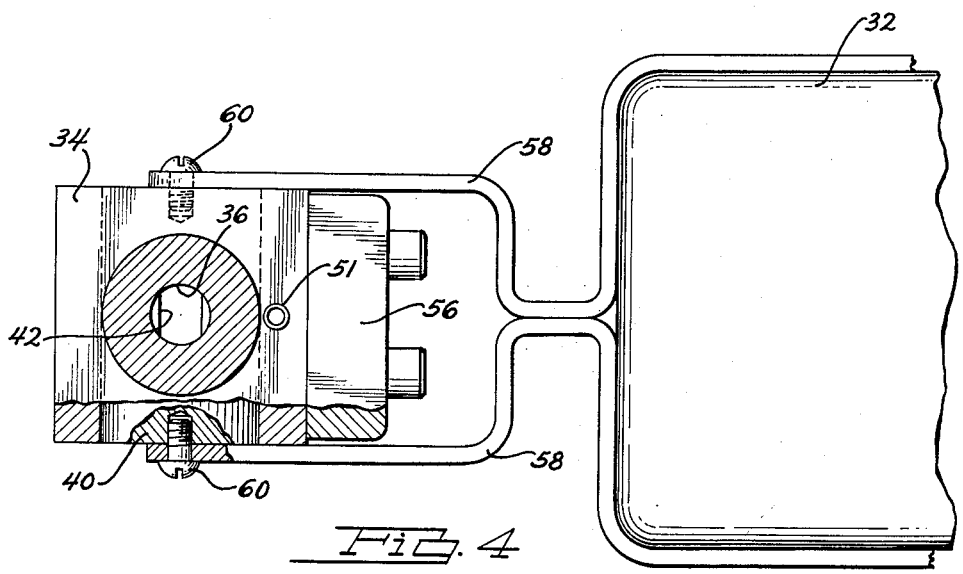
FIGURE 4 is a fragmentary view, partially in cross-section, taken on the plane of line 4—4 of FIGURE 2 and looking in the direction of the arrows.

Adjustability of the fuel level is of course provided for in both embodiments of the invention. That is, in the embodiment illustrated in FIGURES 2–4, the screws 60 would be loosened and the valve 40 rotated some amount clockwise in order to raise the fuel level. After the repositioning of valve 40 were accomplished, the screws 60 would of course again be tightened, thereby rigidly securing the float to the valve 40. If the fuel level were to be lowered, the converse of the above adjustment would apply.

The embodiment of FIGURE 7 also possesses the above ability of adjustment for varying the fuel level. Additionally, however, the level may be adjusted by forcibly rotating the sleeve member 147. That is, if a higher fuel level were desired, the sleeve would be rotated some appropriate amount counterclockwise; if the level were to be made lower, the sleeve would be rotated clockwise. It is apparent that if the fuel level is changed by the repositioning of the sleeve, that it unnecessary to disturb the existing relationship between the float and valve member 140.

Although but two embodiments of the invention have been disclosed and described, it is evident that other modifications are possible within the scope of the appended claims.

What I claim as my invention is:

1. A fuel system for an internal combustion engine, comprising a main fuel tank, a fuel pump, a carburetor including a fuel bowl, a fuel supply line connecting said tank with said pump and said fuel bowl, and an overflow line extending from said bowl to the intake side of said pump, said fuel bowl including a fuel inlet valve assembly comprising a valve body having a horizontally positioned cylindrical bore, a first conduit formed in said body and extending between said bore and said fuel supply line, a second conduit formed in said body and extending between said bore and said fuel bowl, a cylindrical valve member disposed for rotation in said bore, a float member adjustably secured to said cylindrical valve and positioned by the fuel level in said bowl, said valve having a first passage formed therein connecting said first and second conduits in said body to permit the flow of fuel into said bowl when the fuel in said bowl is below the desired level, a third conduit formed in said valve body and extending between said bore and a point in said bowl below the desired fuel level, a fourth conduit formed in said body and extending between said bore and said overflow line, said valve having a second passage connecting said third and fourth conduits when the fuel in said bowl is above the desired level so as to provide removal by gravity of excess fuel from said bowl, an air bleed for said second passage to prevent siphoning of fuel from said bowl to said overflow line at fuel levels at or below said desired level.

2. A fuel system for an internal combustion engine, comprising a main fuel tank, a fuel pump, a carburetor including a fuel bowl, a fuel supply line connecting said tank with said pump and said fuel bowl, and an overflow line extending from said bowl to the intake side of said pump, said fuel bowl including a fuel inlet valve assembly comprising a valve body having a horizontally positioned cylindrical bore extending therethrough, a first conduit formed in said body and extending between said bore and and said fuel supply line, a second conduit formed in said body and extending between said bore and said fuel bowl, a cylindrical valve member disposed for rotation in said bore, said valve member being of such a diameter as to provide a clearance between said valve and the walls of said bore, a float member secured to said cylindrical valve and positioned by the fuel level in said bowl, said valve having a first passage formed therein connecting said first and second conduits in said body to permit the flow of fuel into said bowl when the fuel in said bowl is below the desired level, a third conduit formed in said valve body and extending between said bore and a point in said bowl below the desired fuel level, a fourth conduit formed in said body and extending between said bore and said overflow line, said valve having a second passage connecting said third and fourth conduits when the fuel in said bowl is above the desired level so as to provide removal by gravity of excess fuel from said bowl, a rotatable cylindrical sleeve positioned in said clearance between said valve and said bore and having openings so as to adjust the degree of communication between said conduits in said body and said passages in said valve, an air bleed for said second passage to prevent siphoning of fuel from said bowl to said overflow line at fuel levels at or below said desired level, said first passage in said valve and said second conduit in said valve body being elongated so as to provide maximum variation in fuel flow path area for small amounts of rotation of said valve by said float on changes of fuel level in said bowl, said overflow line being formed to provide a trap to retail fuel so as to prevent the entry of air into said bowl through said overflow line.

References Cited in the file of this patent

UNITED STATES PATENTS

| | | |
|---|---|---|
| 1,629,545 | Shermann | May 24, 1927 |
| 2,254,850 | Mallory | Sept. 2, 1941 |
| 2,818,111 | Ross | Dec. 31, 1957 |